Oct. 5, 1943.   C. DE GANAHL   2,331,109
HYDRAULIC CONTROLLING VALVE
Original Filed July 10, 1940   3 Sheets-Sheet 1
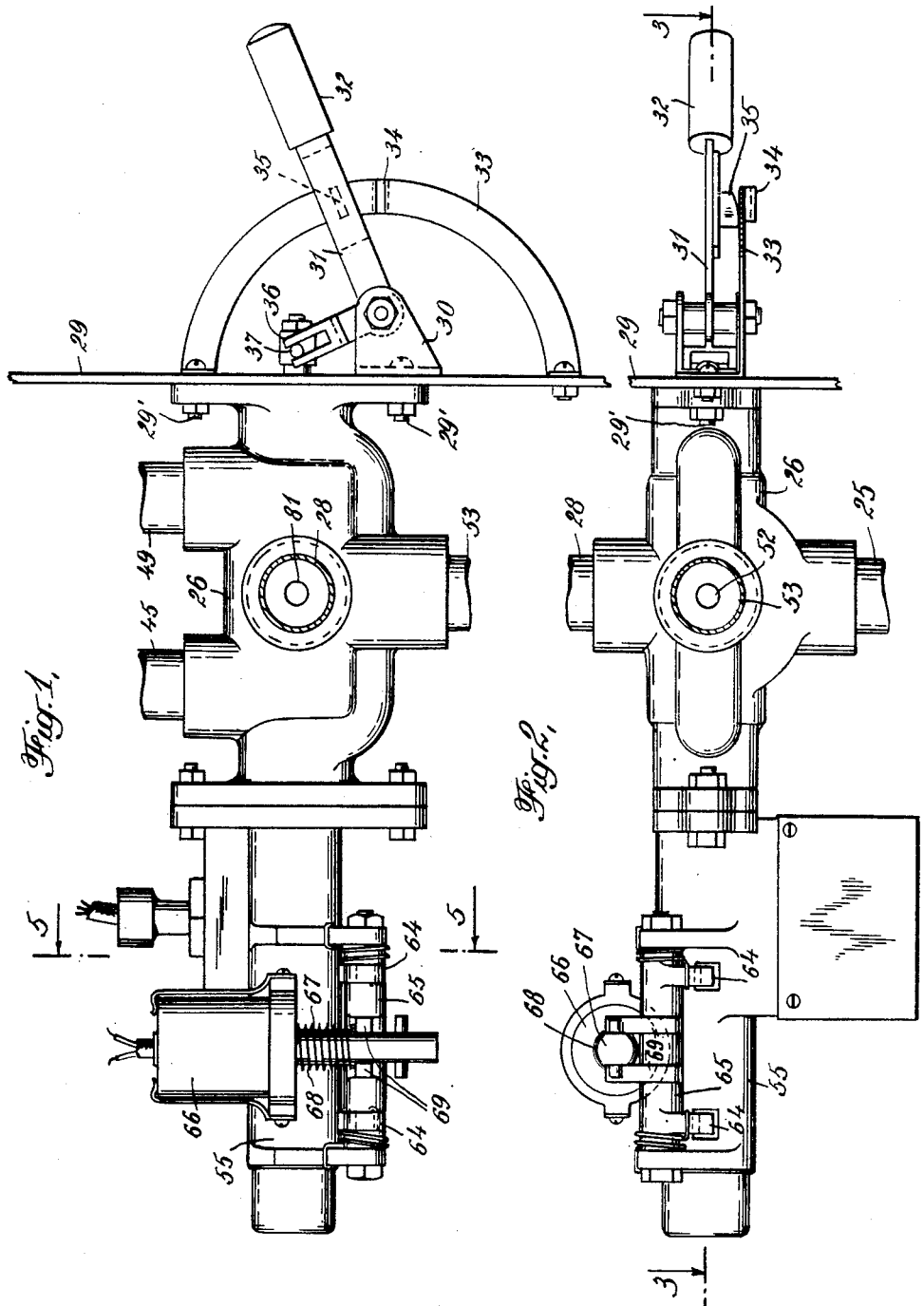
INVENTOR
Carl de Ganahl
BY
ATTORNEYS

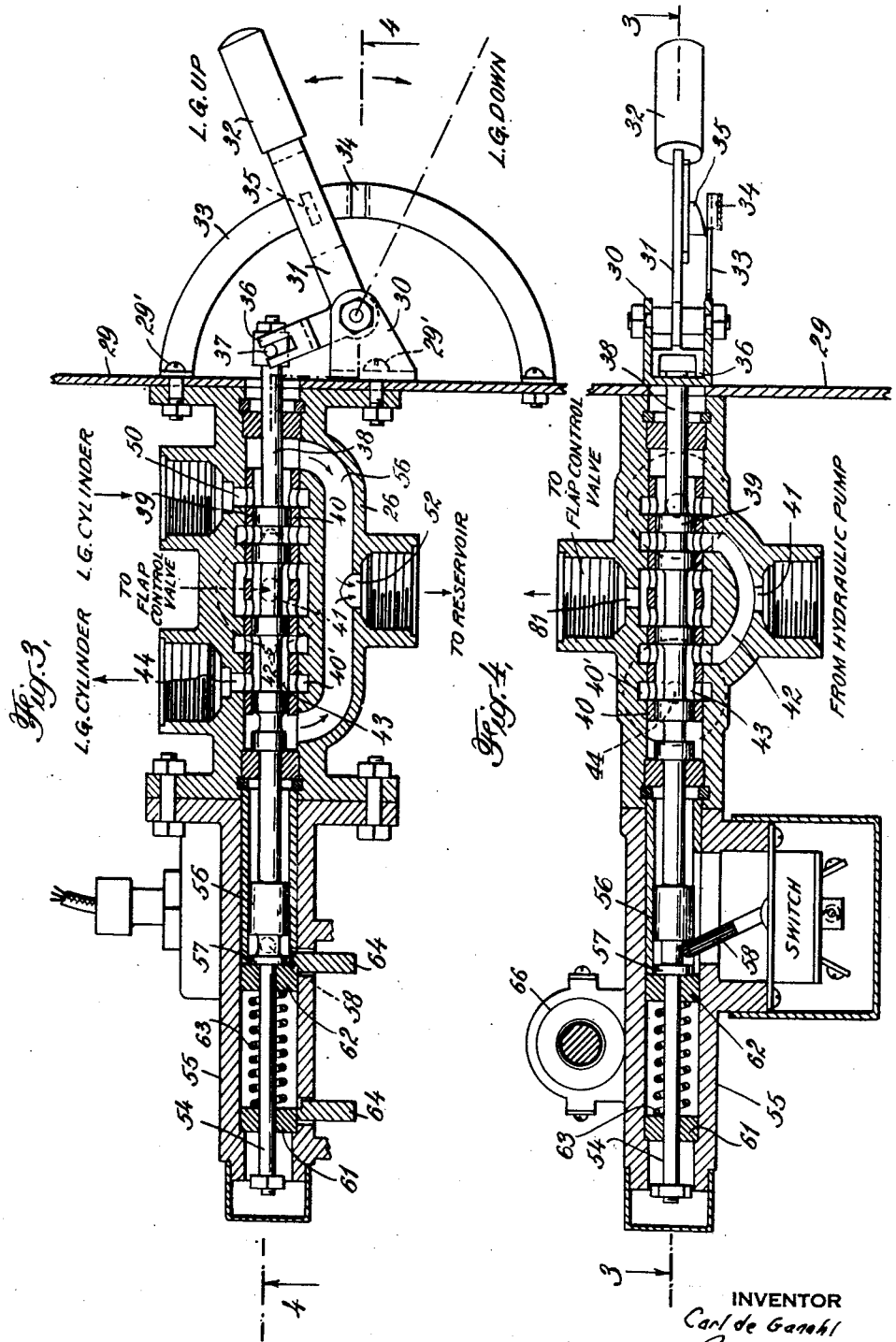

Oct. 5, 1943.　　　　C. DE GANAHL　　　　2,331,109
HYDRAULIC CONTROLLING VALVE
Original Filed July 10, 1940　　3 Sheets-Sheet 3
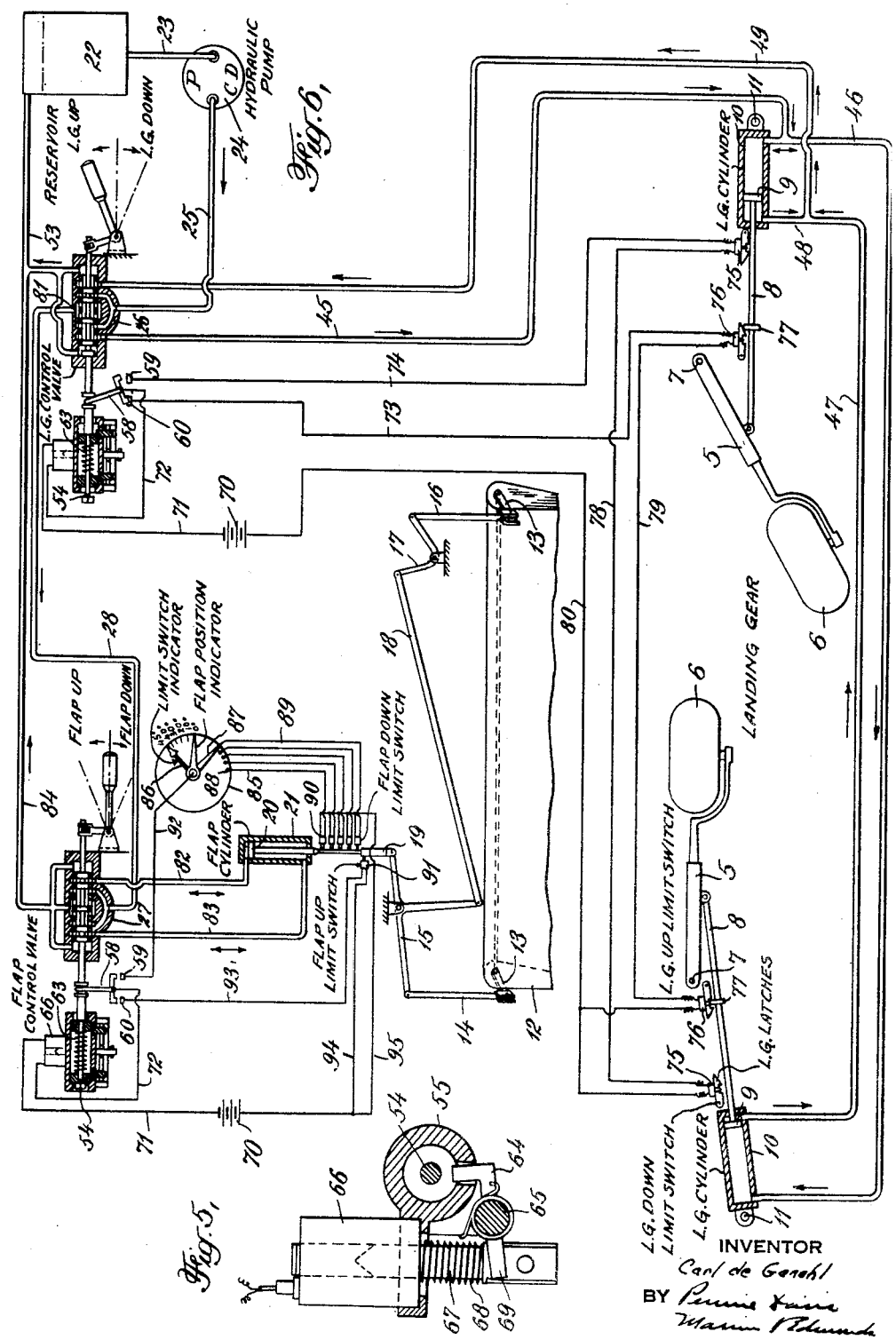
INVENTOR
Carl de Ganahl
BY
ATTORNEYS Patented Oct. 5, 1943

2,331,109

UNITED STATES PATENT OFFICE 2,331,109

HYDRAULIC CONTROLLING VALVE

Carl de Ganahl, Bristol, Pa., assignor, by mesne assignments, to Reconstruction Finance Corporation Original application July 10, 1940, Serial No. 344,764. Divided and this application October 4, 1941, Serial No. 413,663

3 Claims. (Cl. 127—139)

This invention relates to an hydraulic controlling valve, and particularly to such a valve which is adapted to effect certain safeguards in the operation of hydraulic systems, especially with respect to the completion of any operation which is initiated and the avoidance of false operations which might endanger the mechanism or the apparatus in which it is installed.

The hydraulic valve of the present invention is designed more specifically to control the operation of hydraulic mechanism installed in aeroplanes, for example mechanism for actuating landing gear, flaps and other movable elements which must be constantly under the control of the operator. Hydraulically operated mechanism of the type described is now commonly utilized in aeroplanes, but has been subject to certain obvious defects in respect to the certainty of operation, especially the completion of the operation after initiation thereof.

It is the object of the present invention to provide a controlling valve for hydraulic systems, and particularly for hydraulic mechanism capable of actuating various elements in an aeroplane or other device, the valve being designed to ensure completion of the desired operation when it has been initiated, the mechanism being thereupon automatically released.

Another object of the invention is the provision of mechanism which can be released manually by the operator if the automatic control fails for any reason.

Another object of the invention is the provision of a plurality of hydraulic controlling valves connected in series but so arranged that if actuated in unison only one will become effective until the operation controlled thereby has been completed, whereupon the other will automatically perform its function, thereby avoiding reduction of the pressure on the medium employed to actuate the mechanism to the point where it would become ineffective for the purpose.

Another object of the invention is the provision of an hydraulic controlling valve particularly adapted for use with a limit device whereby the intended movement of any particular element or elements such as the flaps of an aeroplane may be set and controlled, the automatic operation being completed when the flaps have moved to the desired extent.

Other objects and advantages of the invention will be apparent as it is better understood by reference to the following specification and accompanying drawings, in which Fig. 1 is a side elevation of a valve and the controlling mechanism therefor adapted to be embodied in an hydraulic system for actuating any desired element;

Fig. 2 is a bottom plan view of the structure shown in Fig. 1;

Fig. 3 is a longitudinal section on the line 3—3 of Fig. 2;

Fig. 4 is a similar section on the line 4—4 of Fig. 3;

Fig. 5 is a section on the line 5—5 of Fig. 1; and

Fig. 6 is a general diagrammatic representation showing embodiment of two valves in an hydraulic system controlling the landing gear and flaps of an aeroplane, it being understood that this drawing is illustrative only and that the invention is not limited to the particular applications shown.

Referring to Fig. 6, the struts 5 of the landing gear, carrying wheels 6, are shown as pivoted at 7. It will be understood that the landing gear is such as is commonly employed in aeroplanes, and that it is supported in the usual manner under the wings of the plane. For purposes of illustration, the two struts 5 are shown in different positions. Each is actuated by a piston rod 8 connected to a piston 9 in a cylinder 10 which is pivoted at 11. The pistons 9 are double acting, so that the landing gear can be lifted or moved to supporting position as desired by supplying fluid under pressure to the respective cylinders 10 under suitable control as hereinafter described.

Also shown in Fig. 6 is the representation of a flap 12 pivotally supported in the usual manner and provided with levers 13, one of which is connected by a link 14 to a bell crank 15, the other being connected to the bell crank 15 by links 16, 17 and 18. The bell crank 15 is connected to a piston rod 19, carrying a piston 20 in a cylinder 21. The piston 20 is likewise double acting, so that the flap may be moved in either direction by supplying fluid under pressure to either end of the cylinder. It is to be understood that any movable element may be connected similarly through suitable linkage to a piston which may be actuated under control of the operator.

The fluid is maintained in a reservoir 22 and is withdrawn through pipe 23 to a constant volume hydraulic pump 24 which delivers the fluid through a pipe 25 to the control valve 26. A similar valve 27, supplied with fluid through pipe 28, controls the movement of the flaps or of any other element which is to be moved under control of the operator. The fluid ordinarily is not under pressure and merely circulates through the system, returning to the reservoir. When, however, it is directed to one or more of the pistons and meets resistance, pressure is built up rapidly by the pump 24 and the fluid pressure is transmitted to the piston to actuate it in the desired direction.

The valve 26 and the companion valve 27 are shown in more detail in Figs. 1-5 inclusive, to which reference is now made. An instrument panel 29 is provided to which the valve 26 is secured by bolts 29'. A bracket 30 on the panel pivotally supports the operating lever 31 having a handle 32 which is shown in the drawings in its uppermost position, indicating actuation of the valve to lift the landing gear. A quadrant 33 is provided with a notch 34 and a tooth 35 on the lever 31 engages the notch when the handle is in the off or neutral position. As indicated, from that position it may be moved also to a position corresponding to the lowering of the landing gear.

The lever 31 is provided with a fork 36 engaging a pin 37 on the valve rod 38 which extends through the valve and housing and is provided with lands 39 at intervals. Within the valve housing which is made preferably of an aluminum alloy is a nitricast iron sleeve 40 through which four circumferentially disposed holes are drilled at intervals corresponding with recesses 40' in the housing. The valve housing is provided at one side with a port 41 which is adapted to be connected to the pipe 25 through which fluid is supplied from the hydraulic pump 24. The fluid passes through a passage 42 and, with the valve disposed in the position indicated in Figs. 3 and 4, the fluid passes to a chamber 43 and thence through a port 44 adapted to be connected to a pipe 45 leading to both cylinders 10, a branch pipe 46 affording connection to one of the cylinders. The fluid thus enters the ends of the cylinders to force the pistons in the proper direction to raise the landing gear. The fluid thus supplied to the cylinders builds up pressure and actuates the pistons until the landing gear has been lifted. The fluid from the opposite side of the two pistons 9 is returned through pipes 47 and 48, the fluid passing thence through a pipe 49 to a port 50 of the valve 26. The fluid passing through the port 50 passes through a passage 56, thence through a port 52 which is connected to a pipe 53 leading to the reservoir 22. Thus, the fluid is returned to the reservoir.

The operation as above described could be accomplished by moving the handle 32 to the position shown in Figs. 3 and 4, and at the completion of the operation moving the handle back to the neutral position in which the circulating fluid enters through the port 41 and escapes through the port 81 without causing the actuating of any mechanism, the operation at this stage being merely circulation of the fluid from the reservoir through both valves and back without developing any pressure until it is desired to actuate some part of the mechanism. To avoid the necessity for such manual operation, provision is made to hold the valve in actuating position when it has moved to that position, and to return it only when the desired operation is completed. To effect this purpose, the valve rod 38 is provided with an extension 54, within a housing 55. The extension 54 carries flanges 56 and 57 adapted to engage a switch lever 58 controlling the movement of a switch having two points 59 and 60 (Fig. 6). The extension 54 also carries two loose washers 61 and 62 which are separated by a spring 63. Detents 64 (Fig. 5) are pivoted at 65 and are adapted to project into the path of the washers 61 and 62 so that when the valve rod 38 is moved to the limit of its travel in either direction, one of the detents 64 will engage the corresponding washer 61 or 62 and hold the valve rod in the selected position, so that the fluid builds up pressure and is effective at the selected point or points to complete the desired operation.

To release the detents, a solenoid 66 is supported on the housing 55 and is provided with a plunger 67 (Fig. 5) which is normally held in the position indicated by a spring 68 which biases the detents 64 to retain the valve mechanism in the selected position. When the solenoid 66 is energized, the plunger 67 is lifted and engages the tail 69 of the detents, thereby withdrawing them, whereupon the spring 63 returns the valve to its normal or neutral position.

In order that the valve may be released only at the completion of the intended operation, I provide an electrical circuit with a source of power 70 which is connected by a conductor 71 to the solenoid 66. The other terminal of the solenoid is connected by a conductor 72 to the switch arm 58 which is actuated by movement of the valve to engage one or the other of the switch points 59 and 60. The switch points 60 and 59 are connected by conductors 73 and 74 to limit switches 75 and 76 disposed adjacent and adapted to be actuated by flanges 77 on the piston rods 8. The limit switches 75 and 76 for each of the two sides of the landing gear are connected in series by conductors 78 and 79 and by a return conductor 80, which is connected to the source of power 70. Thus, when the valve has been moved to the point where fluid is delivered to the cylinders 10, to lift the landing gear as indicated in Fig. 6, the connection from the source of fluid pressure will be maintained until the landing gear has been raised and the limit switches 76 have been actuated, whereupon the solenoid 66 will become effective to release the valve which will return to normal position.

Where one or more valves adapted to actuate mechanism for different functions are connected in series as indicated in Fig. 6, the second valve may be actuated and will be locked in the actuating position. However, the pipe 28 which supplies fluid to the second valve is connected to a port 81 of the first valve and cannot receive the fluid until the first valve has completed its function and has returned to normal position, whereupon fluid entering through the port 41 will be directed through the port 81 and pipe 28 to the second valve which will then permit the flow of fluid through a pipe 82 to the cylinder 21, the fluid from the opposite side of piston 20 returning thence through a conduit 83 to the valve and through a pipe 84 to the reservoir 22.

The mechanism of the valve 27 is identical with that of the valve 26, and need not be described, therefore, in detail. However, in order to permit movement of an element, for example a flap, to any desired degree, and to release the valve when the particular movement has been completed, I provide a limit switch 85 having an indicator 86. By moving the indicator to the desired point, a contact 87 is moved over a plurality of points 88 connected by conductors 89 to contacts 90 disposed in the path of the piston rod 19. A single limit switch 91 is likewise provided in the path of the piston rod 19. The contact 59 is connected by a conductor 92 to the switch 85, and a conductor 93 connects the contact 60 with the limit switch 91. Return conductors 94 and 95 are connected to the source of power 70. When the flap is to be moved down, the limit of the desired movement may be set on the indicator, and when the piston has traveled to the extent desired, it will automatically close the circuit and release the valve, which will return to normal position. Similarly, when the flap is to be moved up, the valve will be released automatically, when the flap has reached its uppermost position, by limit switch 91.

Should the electrical mechanism fail for any reason, it is still possible for the operator to return the valve manually to neutral position. The washers 61 and 62, being loose on the extension 54 and separated by the spring 63, do not prevent manually actuated movement of the valve which floats in the sleeve 40 and will remain in adjusted position until moved manually or by the spring 63.

It will be understood that the several operations as described are representative of similar operations which can be conducted with respect to any movable elements, and that any number of valves may be disposed in series and so connected that they will function serially when two or more of the operating handles are moved to either of the operating positions, and that each valve will be retained in operative position until the desired operation has been completed, whereupon each valve will be released and returned to normal position. Thus, by way of illustration, the operator could set the valve 26 to lower the landing gear and at the same time set the valve 27 and the indicator 86 to effect movement of the flaps. The landing gear would immediately move to landing position, and when the operation was completed the valve 26 would be released and the valve 27 would then come into operation to effect movement of the flaps. Obviously, any desired arrangement of the valves and of the relation of effective operation thereof could be set up, and other valves and mechanism controlled thereby could be added to the arrangement illustrated in Fig. 6. Any desired combination, therefore, can be utilized, since the invention rests primarily in the valve and the mechanism whereby the valve is held in operative position until completion of the particular desired function.

The valve of the present invention, with its controlling devices, affords practical and safe means for moving the various elements of an aeroplane or of any other similar mechanism in which hydraulic operation is desirable. The operator is assured in every instance when the valve is moved to the limit of its travel in either direction, that the operation will be completed and the valve will be returned automatically.

Various changes may be made in the details of construction and of operation of the various parts of the mechanism without departing from the invention or sacrificing the advantages thereof.

No claim is made in this application to the hydraulic actuating mechanism, other than the hydraulic controlling valve, as such features are claimed in my copending application Serial No. 344,764, filed July 10, 1940, of which this application is a division.

I claim:

1. An hydraulic controlling valve comprising a casing having an inner sleeve with sets of holes and chambers with ports connected therewith, a piston valve movable in the sleeve and having lands adapted to direct a fluid to the desired ports, means for moving the valve from neutral position, means for holding the valve in selected position, and means for automatically returning the valve to neutral position, including an extension of the valve, washers loosely supported thereon, a spring between the washers, abutments supporting the washers, a latch adapted to engage one of the washers and electrically controllable means to release the latch.

2. An hydraulic controlling valve comprising a casing having an inner sleeve with sets of holes and chambers with ports connected therewith, a piston valve movable in the sleeve and having lands adapted to direct a fluid to the desired ports, means for moving the valve from neutral position, means for holding the valve in selected position, and means for automatically returning the valve to neutral position, including an extension of the valve, washers loosely supported thereon, a spring between the washers, abutments supporting the washers, latches adapted to engage one or the other of the washers at the limit of travel of the valve in either direction and electrically controllable means to release the latches.

3. An hydraulic controlling valve comprising a casing having an inner sleeve with sets of holes and chambers with ports connected therewith, a piston valve movable in the sleeve and having lands adapted to direct a fluid to the desired ports, means for moving the valve from neutral position, means for holding the valve in selected position, and means for automatically returning the valve to neutral position, including an extension of the valve, washers loosely supported thereon, a spring between the washers, abutments supporting the washers, a latch adapted to engage one of the washers and electrically controllable means to release the latch, including a switch and electrical circuit including the switch and electrically controllable means whereby the valve is released when a predetermined operation is completed.

CARL DE GANAHL.